(12) United States Patent
Allen et al.

(10) Patent No.: US 6,431,423 B1
(45) Date of Patent: Aug. 13, 2002

(54) ASSEMBLY FOR CARRYING A BICYCLE ON A VEHICLE

(75) Inventors: Scott R. Allen, Fieldbrook; Stephen J. Cole, Arcata; Gregory A. Dean; Duncan G. Robins, both of McKinleyville; Joseph J. Settelmayer, Fieldbrook, all of CA (US)

(73) Assignee: Yakima Products, Inc., Arcata, CA (US)

( * ) Notice: Subject to any disclaimer, the term of this patent is extended or adjusted under 35 U.S.C. 154(b) by 0 days.

(21) Appl. No.: 09/574,677

(22) Filed: May 17, 2000

Related U.S. Application Data

(63) Continuation-in-part of application No. 09/556,878, filed on Apr. 19, 2000, which is a continuation-in-part of application No. 09/505,056, filed on Feb. 16, 2000, which is a continuation-in-part of application No. 09/447,908, filed on Nov. 23, 1999, now Pat. No. 6,283,310, and a continuation-in-part of application No. 09/466,233, filed on Dec. 17, 1999, now Pat. No. 6,286,738.

(51) Int. Cl.⁷ ................................................. B60R 9/06
(52) U.S. Cl. ....................... 224/509; 224/324; 224/533; 224/537; 224/924
(58) Field of Search ................................. 224/924, 501, 224/502, 509, 533, 537, 324

(56) References Cited

U.S. PATENT DOCUMENTS

| 303,686 A | 8/1884 | Whitney |
| 355,107 A | 12/1886 | Scollay |
| 357,287 A | 2/1887 | Nolte |
| 376,055 A | 1/1888 | Hopkins et al. |
| 688,677 A | 12/1901 | Paddock |
| 1,055,665 A | 3/1913 | Schmidt |
| 2,271,452 A | 1/1942 | Carroll |
| 2,803,349 A | 8/1957 | Talbot |
| 2,844,856 A | 7/1958 | Mueller et al. |
| 2,889,165 A | 6/1959 | Zientara |
| 3,184,880 A | 5/1965 | Ratte |
| 3,239,115 A | 3/1966 | Bott et al. |
| 3,258,820 A | 7/1966 | Steinberg |
| 3,292,222 A | 12/1966 | Steinberg |
| 3,464,608 A | * 9/1969 | Rodriguez .................. 224/924 |
| 3,484,908 A | 12/1969 | Lamb |
| 3,662,435 A | 5/1972 | Allsop |
| 3,668,791 A | 6/1972 | Salzman et al. |
| 3,828,993 A | 8/1974 | Carter |

(List continued on next page.)

FOREIGN PATENT DOCUMENTS

| CH | 272137 | 4/1949 |
| DE | 3034750 | 4/1982 |
| EP | 0 161 441 A1 | 11/1985 |
| EP | 0 220 784 A1 | 5/1987 |
| EP | 0 224 288 A1 | 6/1987 |
| FR | 2 221 329 | 11/1974 |
| FR | 2 332 155 | 7/1977 |
| FR | 2 451 296 | 10/1980 |
| GB | 2 220 344 A | 1/1990 |
| IT | 022451 | 11/1989 |

*Primary Examiner*—Stephen P. Garbe
(74) *Attorney, Agent, or Firm*—Kolisch Hartwell Dickinson McCormack & Heuser

(57) ABSTRACT

A rack assembly for carrying recreational equipment on a vehicle. The assembly includes at least one mount attachable to the vehicle, and a load-carrying support member coupled to the mount and configured to support the recreational equipment adjacent the vehicle. At least one securing apparatus is associated with the load-carrying support member and configured to secure the equipment to the support member. The securing apparatus includes a strap adapted to extend at least partially around the recreational equipment, and a ratchet drive mechanism adapted to receive and grip one end of the strap. In one embodiment, the ratchet drive mechanism includes at least one drive actuator that is operable to grip successive portions of the strap and draw it tight around the recreational equipment.

39 Claims, 8 Drawing Sheets

U.S. PATENT DOCUMENTS

| | | |
|---|---|---|
| 3,848,784 A | 11/1974 | Shimano et al. |
| 3,900,923 A | 8/1975 | Thomas |
| 3,906,593 A | 9/1975 | Caveney et al. |
| 3,922,018 A | 11/1975 | Shook |
| 4,021,888 A | 5/1977 | Aimar |
| 4,028,915 A | 6/1977 | Stahl |
| 4,112,557 A | 9/1978 | Salomon |
| 4,114,409 A | 9/1978 | Scire |
| RE29,840 E | 11/1978 | Wasserman |
| 4,193,171 A | 3/1980 | Lichowsky |
| 4,274,569 A | 6/1981 | Winter et al. |
| 4,299,341 A * | 11/1981 | Copeland et al. ............ 224/924 |
| 4,310,951 A | 1/1982 | Riedel |
| 4,326,320 A | 4/1982 | Riedel |
| 4,424,636 A | 1/1984 | Everest |
| 4,453,290 A | 6/1984 | Riedel |
| 4,501,354 A | 2/1985 | Hoffman |
| 4,547,980 A | 10/1985 | Olivieri |
| 4,553,292 A | 11/1985 | Praider et al. |
| 4,555,830 A | 12/1985 | Petrini et al. |
| 4,596,080 A | 6/1986 | Benoit et al. |
| 4,614,047 A | 9/1986 | Arieh et al. |
| 4,619,122 A | 10/1986 | Simpson |
| 4,621,873 A | 11/1986 | Weinstein et al. |
| 4,624,063 A | 11/1986 | Delery |
| 4,629,104 A | 12/1986 | Jacquet |
| 4,646,401 A | 3/1987 | Morell |
| 4,670,946 A | 6/1987 | Olivieri |
| 4,675,954 A | 6/1987 | Gullickson |
| 4,683,620 A | 8/1987 | Valsecchi et al. |
| 4,724,692 A | 2/1988 | Turin et al. |
| 4,727,630 A | 3/1988 | Alan |
| 4,759,137 A | 7/1988 | Lederer |
| 4,761,859 A | 8/1988 | Calabrigo |
| 4,761,898 A | 8/1988 | Courvoisier et al. |
| 4,763,957 A | 8/1988 | Poehlmann et al. |
| 4,770,011 A | 9/1988 | Constant |
| 4,789,206 A | 12/1988 | Ozaki |
| 4,796,337 A | 1/1989 | Marxer |
| 4,842,148 A | 6/1989 | Bowman |
| 4,887,754 A | 12/1989 | Boyer et al. |
| 4,912,817 A | 4/1990 | Sandreid |
| 4,934,572 A | 6/1990 | Bowman et al. |
| 4,939,824 A | 7/1990 | Reed |
| 4,951,487 A | 8/1990 | Dennis |
| 4,964,287 A | 10/1990 | Gaul |
| 5,003,672 A | 4/1991 | Randall |
| 5,003,711 A | 4/1991 | Nerrinck et al. |
| 5,005,390 A | 4/1991 | Giannini et al. |
| 5,007,260 A | 4/1991 | Sharp |
| 5,022,672 A | 6/1991 | Kawai |
| 5,027,628 A | 7/1991 | De Rocher et al. |
| 5,037,019 A | 8/1991 | Sokn |
| 5,042,705 A | 8/1991 | Johansson |
| 5,052,605 A | 10/1991 | Johansson |
| 5,065,921 A | 11/1991 | Mobley |
| 5,083,350 A | 1/1992 | Sandreid |
| 5,098,162 A | 3/1992 | Forget et al. |
| 5,118,125 A | 6/1992 | Plunkett |
| 5,135,330 A | 8/1992 | Chen |
| 5,165,762 A | 11/1992 | Phillips |
| 5,169,044 A | 12/1992 | Englander |
| 5,172,454 A | 12/1992 | Martignago |
| 5,193,254 A | 3/1993 | Geisinger |
| 5,195,670 A | 3/1993 | Piretti et al. |
| 5,211,323 A | 5/1993 | Chimenti et al. |
| 5,226,341 A | 7/1993 | Shores |
| 5,232,134 A | 8/1993 | Allen |
| 5,244,133 A * | 9/1993 | Abbott et al. ................ 224/924 |
| 5,259,542 A | 11/1993 | Newbold et al. |
| 5,275,319 A | 1/1994 | Ruana |
| 5,288,001 A | 2/1994 | Locarno |
| 5,291,763 A | 3/1994 | Cuisinot |
| 5,303,857 A | 4/1994 | Hewson |
| 5,305,936 A | 4/1994 | Nusbaum |
| 5,357,690 A | 10/1994 | Ho |
| 5,362,173 A | 11/1994 | Ng |
| 5,363,996 A | 11/1994 | Raaber et al. |
| 5,416,952 A | 5/1995 | Dodge |
| 5,426,826 A | 6/1995 | Takimoto |
| 5,448,805 A | 9/1995 | Allen et al. |
| 5,492,258 A | 2/1996 | Brunner |
| 5,511,894 A | 4/1996 | Ng |
| 5,526,555 A | 6/1996 | Battistella et al. |
| 5,570,825 A | 11/1996 | Cona |
| 5,573,165 A | 11/1996 | Bloemer et al. |
| 5,593,076 A | 1/1997 | Biondo |
| 5,598,959 A | 2/1997 | Lorensen et al. |
| D378,289 S | 3/1997 | Lundgren |
| 5,658,119 A * | 8/1997 | Allsop et al. ................ 224/537 |
| 5,664,717 A * | 9/1997 | Joder ........................ 224/537 |
| 5,745,959 A | 5/1998 | Dodge |
| 5,752,298 A | 5/1998 | Howell |
| 5,775,555 A | 7/1998 | Bloemer et al. |
| 5,775,560 A * | 7/1998 | Zahn et al. .................. 224/524 |
| 5,996,870 A * | 12/1999 | Shaver ........................ 224/924 |
| 6,023,821 A | 2/2000 | Murray |

\* cited by examiner

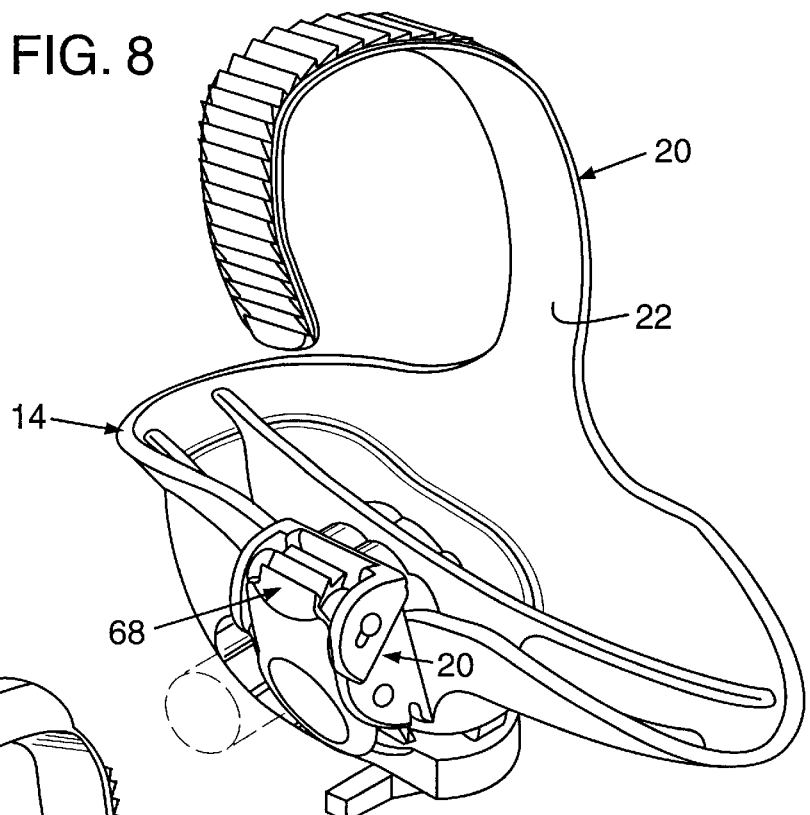
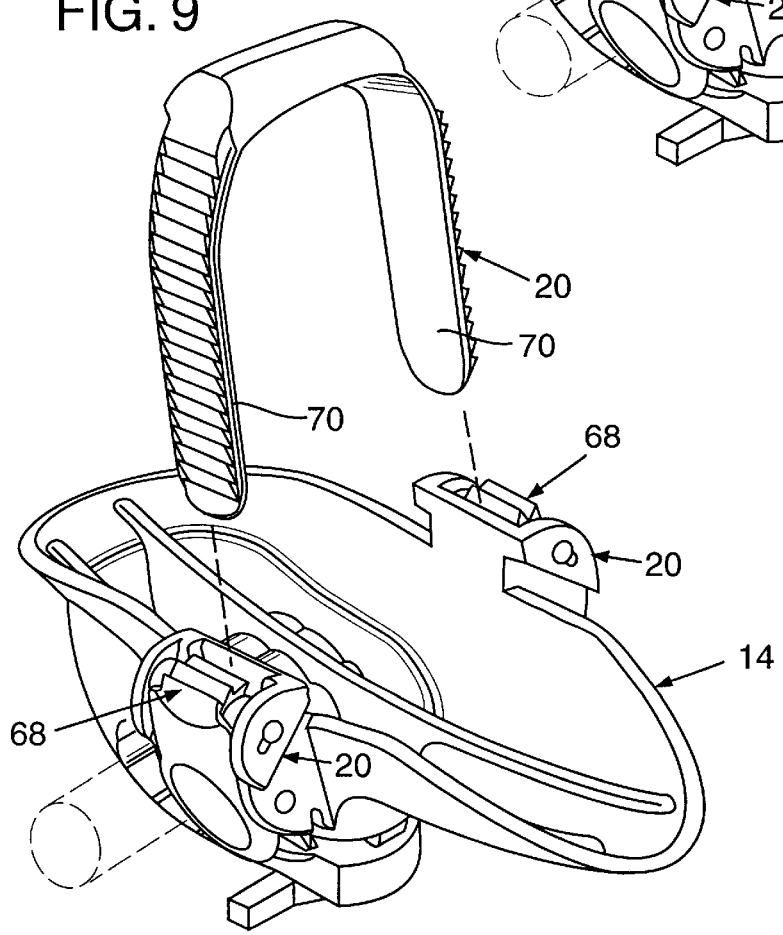
FIG. 8
FIG. 9

ASSEMBLY FOR CARRYING A BICYCLE ON A VEHICLE

CROSS-REFERENCE TO RELATED APPLICATIONS

This application is a continuation-in-part of U.S. patent application Ser. No. 09/556,878, filed Apr. 19, 2000, which is a continuation-in-part of U.S. patent application Ser. No. 09/505,056 filed Feb. 16, 2000 which is a continuation-in-part of U.S. patent application Ser. No. 09/447,908, filed Nov. 23, 1999 now U.S. Pat. No. 6,283,310. This application is also a continuation-in-part of U.S. patent application Ser. No. 09/466,233, filed Dec. 17, 1999 now U.S. Pat. No. 6,286,738. All of the above-identified patent applications are hereby incorporated by reference.

FIELD OF THE INVENTION

The present invention relates to vehicle racks, and more particularly to a rack assembly for carrying a bicycle on a vehicle having a rear hitch-mount.

BACKGROUND

The popularity of recreational cycling has grown substantially in recent years. As a result, the demand for bicycle carriers to transport bikes on cars and other vehicles has also grown.

There are various types of vehicle-mountable bicycle racks available. One type is mountable on the rear hitch-mount of a vehicle to carry one or more bicycles adjacent the rear of the vehicle. These type racks are usually configured to receive and hold the top tube of a bicycle. One or more straps may be positioned around the bicycle to secure it to the rack. Typically, the straps must be pulled tightly around the bicycle to hold it securely during normal driving speeds and conditions. Some users may find it difficult to apply sufficient tension to the strap. In addition, some users may find it difficult to secure the strap while maintaining the desired tension. Furthermore, even normal acceleration or deceleration of the vehicle can cause the bicycles to swing or become misaligned on the rack, resulting in damage to the bikes and/or the vehicle.

SUMMARY

The present invention provides a rack assembly for carrying bicycles on a vehicle. The assembly includes at least one mount attachable to the vehicle, and a load-carrying support member coupled to the mount and configured to support the bicycle adjacent the vehicle. In one embodiment, a stabilizer member is provided to impede swinging of the bicycle. In another embodiment, a securing apparatus is provided to secure the bicycle to the support member. The securing apparatus includes a strap, adapted to extend at least partially around the bicycle, and at least one of a ratchet mechanism or a drive actuator. The ratchet mechanism is adapted to receive and grip one end of the strap. The drive actuator is operable to grip the strap and draw it tight around the bicycle.

BRIEF DESCRIPTION OF THE DRAWINGS

FIG. 8 is an isometric view of another exemplary embodiment of the invention in which the securing apparatus is integrally formed with the supporting member.

FIG. 9 is an isometric view of another exemplary embodiment of the invention in which two ratchet drive mechanisms are formed on either side of a support member to receive opposite ends of a reversible strap.

DETAILED DESCRIPTION

Figure 1:
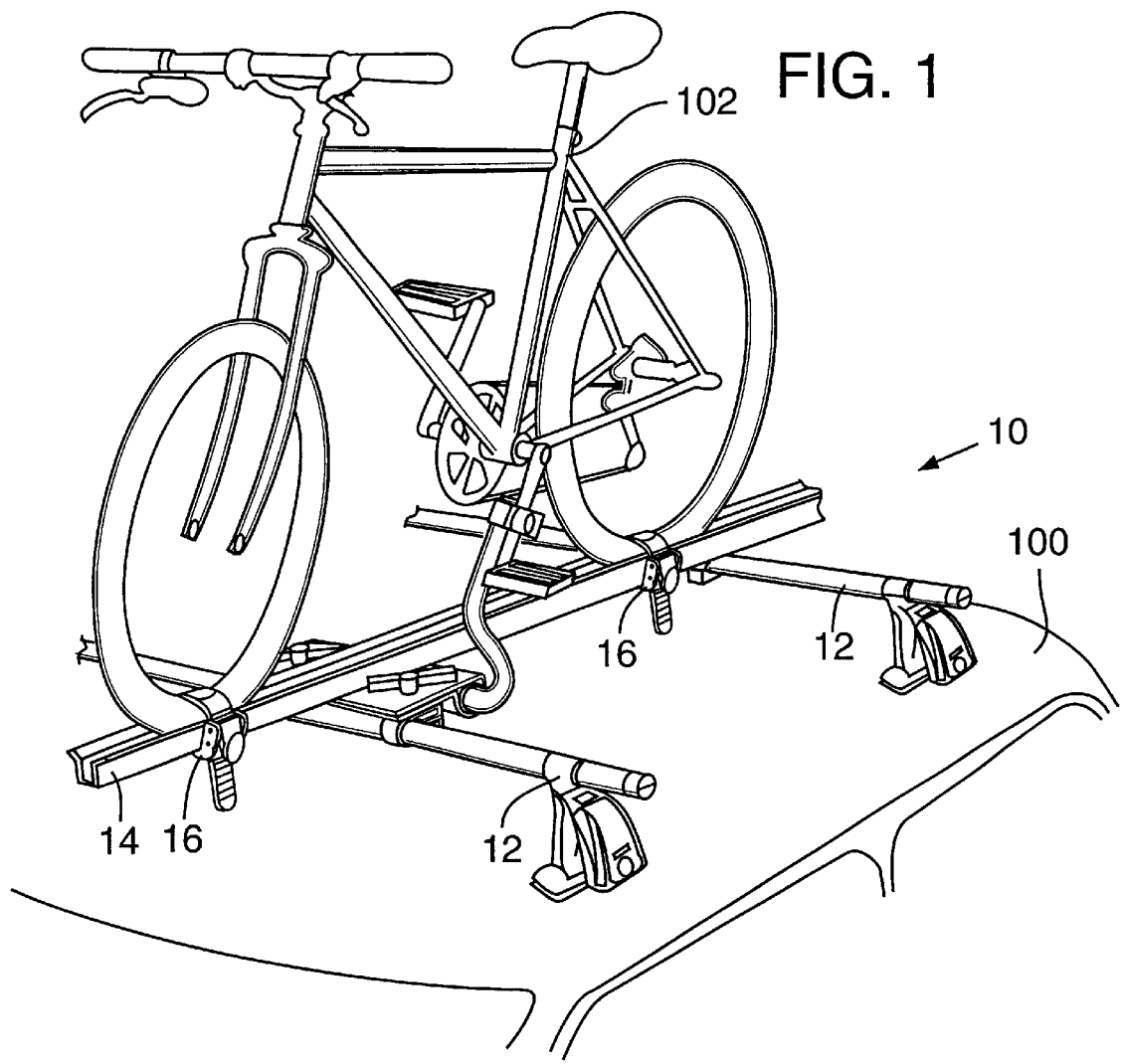
FIG. 1 is a perspective view of an exemplary embodiment of a rack assembly according to the present invention.

A rack assembly for carrying recreational equipment on a vehicle according to the present invention is indicated generally at 10 in FIG. 1. Rack assembly 10 includes one or more mounts 12 attachable to a vehicle. Rack assembly 10 also includes one or more support members 14 coupled to mounts 12 and adapted to support recreational equipment adjacent a vehicle. At least one securing apparatus 16 is associated with each support member 14 to secure recreational equipment to the support member.

In the exemplary embodiment depicted in FIG. 1, rack assembly 10 is shown mounted on the roof of a vehicle 100, and having a wheel support member 14 adapted to support the wheel of a bicycle 102. Alternatively, rack assembly 10 may be configured to mount at other positions on a vehicle such as the rear or trunk of the vehicle, on a vehicle hitch, etc. In addition, rack assembly 10 may include support members that are adapted to carry recreational equipment other than bicycles such as canoes, kayaks, surfboards, camping equipment, etc. Therefore, while the invention is described below in the context of securing a bicycle to a rack mounted on the roof of a vehicle, it will be understood that all such vehicle racks and support members are included within the scope of the invention.

Figure 2:
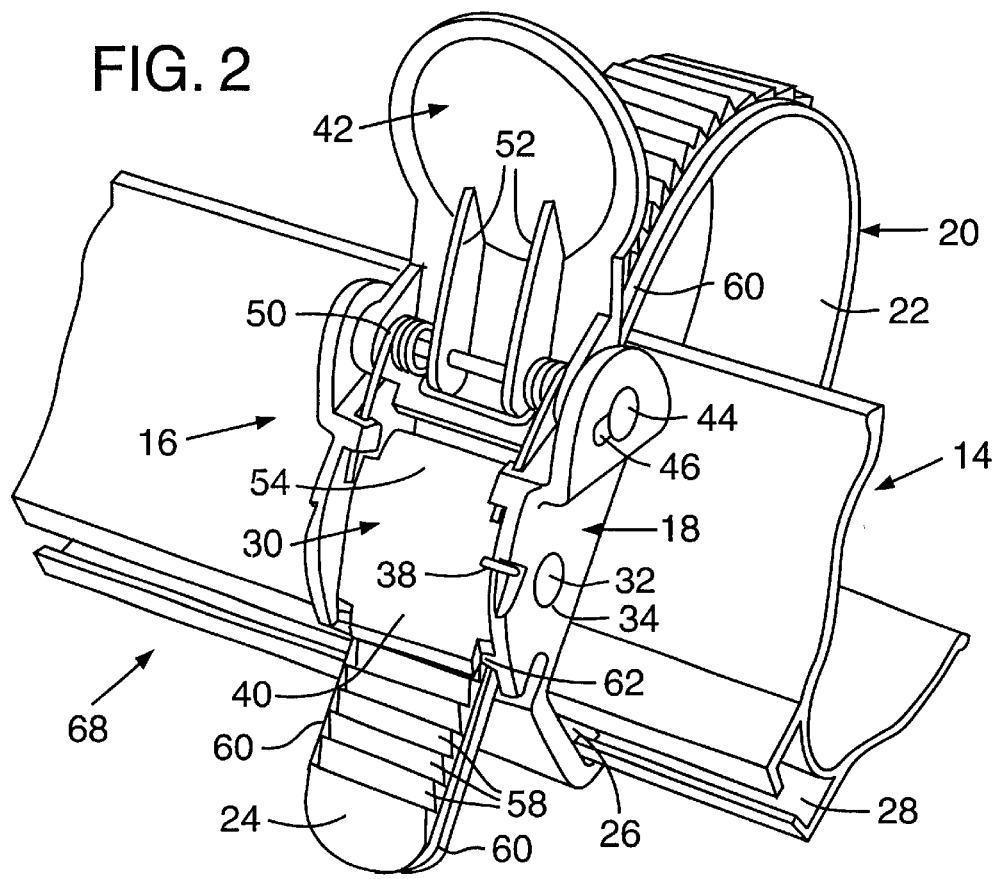
FIG. 2 is an isometric view showing a securing apparatus and portion of a support mount according to the present invention. The drive actuator is shown pivoted upward to advance the strap into the housing.
Figure 3:
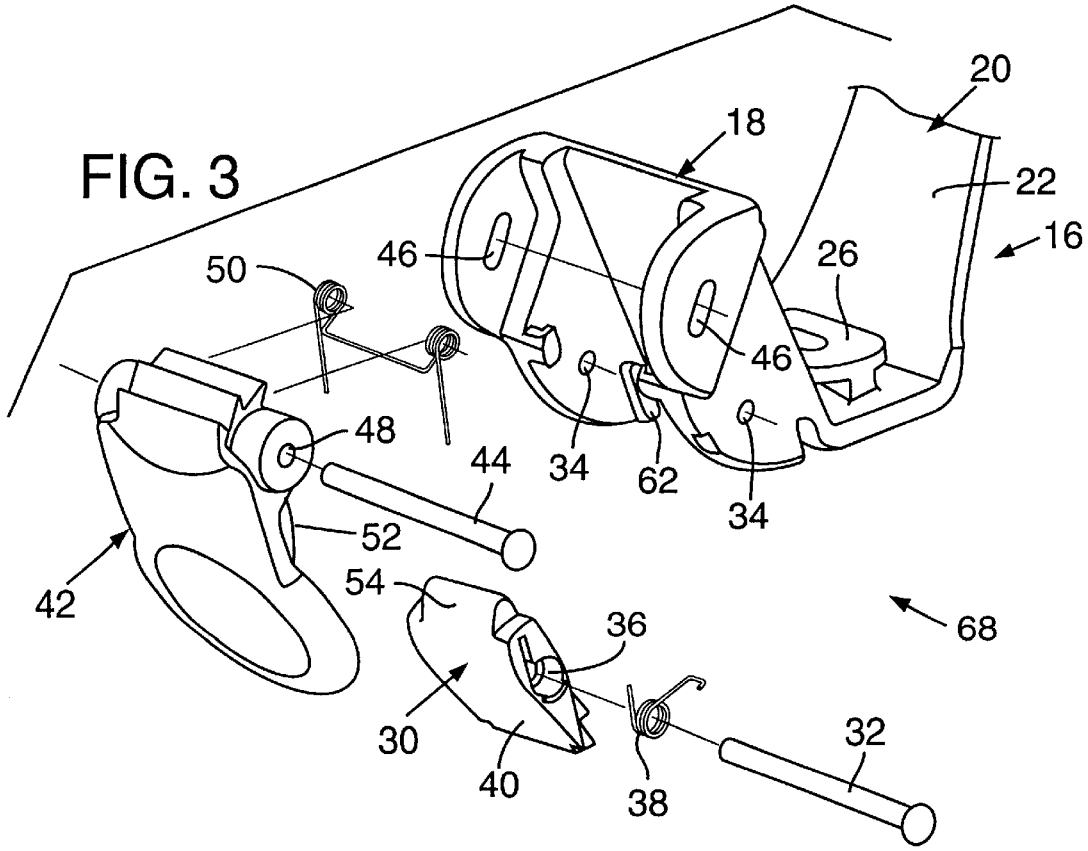
FIG. 3 is an exploded isometric view of the securing apparatus of FIG. 2, with a portion of the strap cut away.

Turning attention to FIGS. 2 and 3, securing apparatus 16 is shown in greater detail. The securing apparatus includes a housing 18, and a strap 20 having a near end 22 and a far end 24. In the exemplary embodiment, near end 22 is integrally formed with housing 18 from a single material. Alternatively, strap 20 and housing 18 may be formed separately and connected by any suitable means such as rivets, bolts, etc. In any event, far end 24 is adapted to extend around at least a portion of the recreational equipment and be received into housing 18.

Securing apparatus 16 is movably coupled to support member 14 to allow the strap to be selectively positioned on the support member. The securing apparatus includes a tongue 26 adapted to slidably engage a channel 28 in support member 14. Alternatively, securing apparatus 16 may be movably coupled to support member by other suitable mechanisms, or may be rigidly attached to the support member by a bolt, rivet, etc. As a further alternative, the securing member may not be attached to the support member, but instead may encircle the support member and recreational equipment to hold the equipment securely against the support member.

Securing apparatus 16 also includes a locking member 30 coupled to housing 18 and configured to engage the strap and retain it in the housing. Locking member 30 is configured to allow the strap to be inserted into the housing while preventing the strap from being removed from the housing. In the exemplary embodiment, the locking member is pivotally coupled to the housing by a rivet pin 32 which extends through holes 34 in the housing and hole 36 in the locking member. A spring 38 biases a back end 40 of the locking member toward the housing.

The securing apparatus further includes a drive actuator or lever 42 coupled to housing 18 and operable to grip the strap and advance it through the housing to tighten the strap around the recreational equipment. In the exemplary embodiment, drive actuator 42 is pivotally coupled to housing 18 by a rivet pin 44 that passes through holes 46 in the housing and holes 48 in the drive actuator. A spring 50 biases the drive actuator downward over locking member 30. A pair of ribs 52 are formed on the underside of the drive actuator and abut against a front end 54 of the locking member.

The operation of securing apparatus 16 is illustrated in FIGS. 4–7. Apparatus 16 is shown movably coupled to a support member 14, which is adapted to support a wheel 104 of a bicycle. Strap 20 extends around wheel 104 and is received into housing 18. A plurality of grip elements or teeth 58 extend laterally across the strap. The strap passes between drive actuator 42 and locking member 30 on one side and the bottom wall of housing 18 on the other side. Teeth 58 face toward the drive actuator and locking member so that the strap can slide along the bottom wall of the housing. As best seen in FIGS. 2 and 3, teeth 58 extend across the strap between smooth edge regions 60. The strap passes into the housing and under opposing guide rails 62 projecting from either side of the housing. The guide rails slide over edge regions 60 and hold the strap against the bottom wall of the housing.

Figure 4:
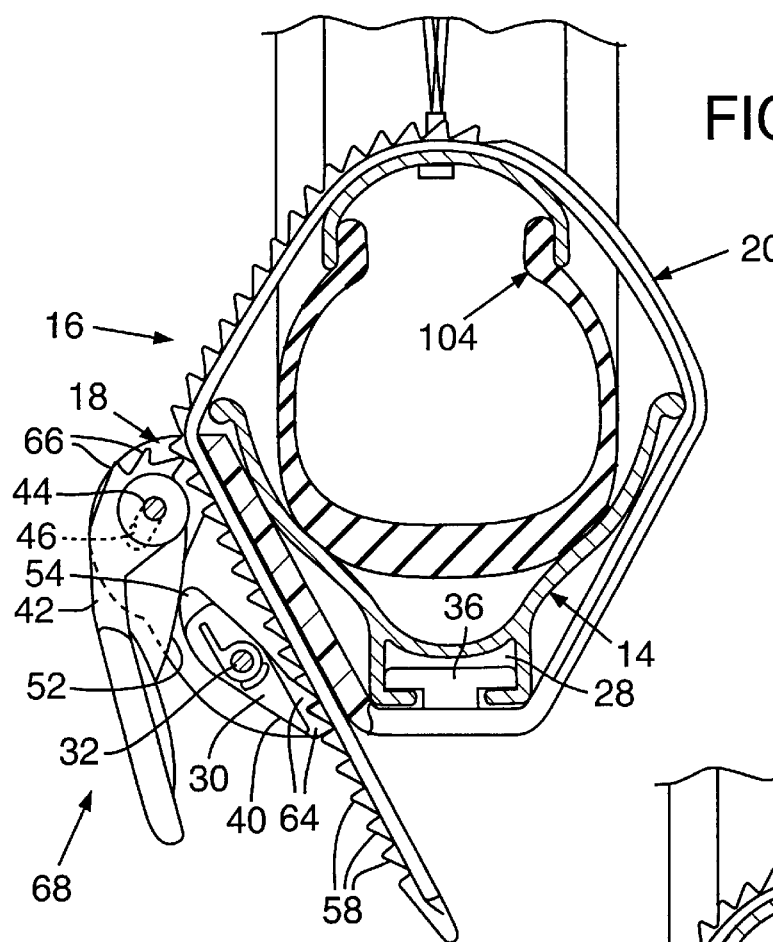
FIG. 4 is a front elevation and partial cross-sectional view showing a securing apparatus attached to a support member and arranged to secure a bicycle tire to the support member. The actuator arm is shown in a nominal, released position.
Figure 5:
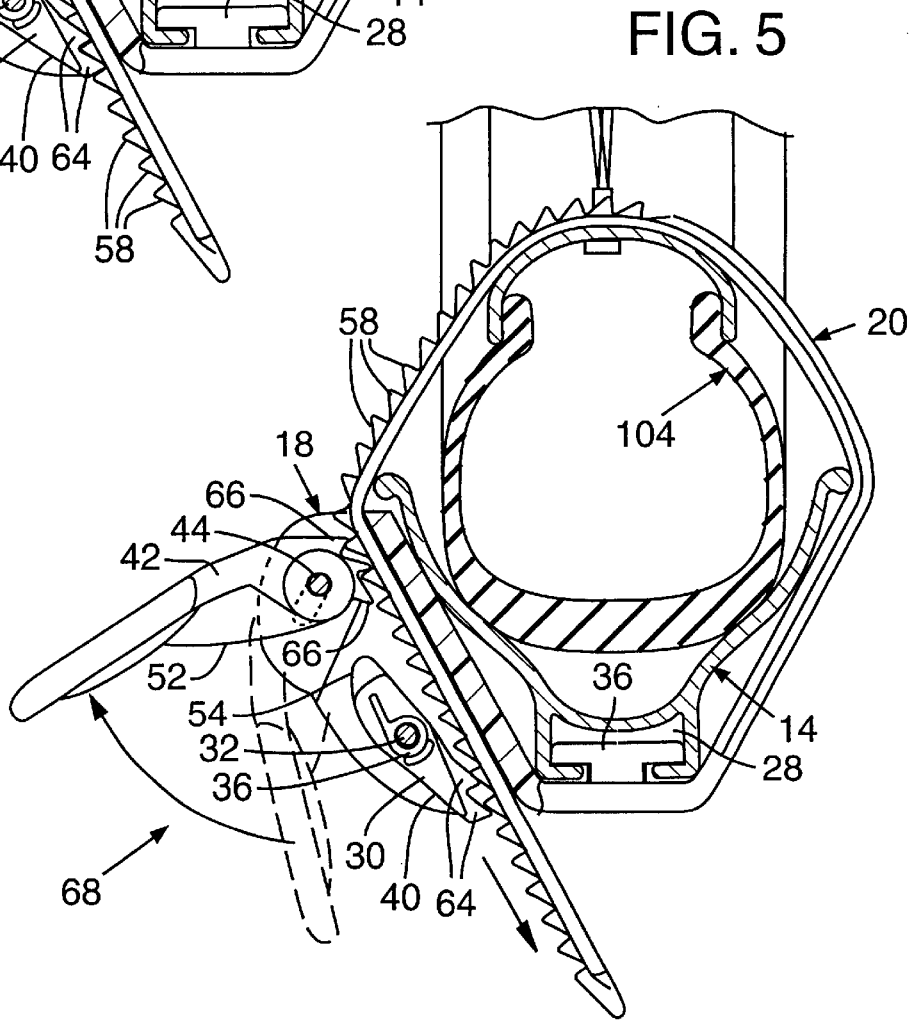
FIG. 5 is similar to FIG. 4 but shows the actuator arm pivoted upward to drive the strap through the housing.

In the exemplary embodiment, locking member 30 functions as a ratchet. Referring back to FIGS. 4–7, the underside of locking member 30 includes a pawl structure such as one or more teeth 64, configured to engage teeth 58 on the strap. Teeth 64 are disposed adjacent back end 40 and interlock with teeth 58 when the back end is pivoted toward the strap, as seen in FIG. 4. Teeth 58 on the strap and teeth 64 on the locking member are formed with an incline such that the locking member only grips the strap in one direction. When the strap is pulled in a forward direction through the housing, locking member 30 pivots upward to allow the strap to pass, as shown in FIG. 5. However, when the strap is pulled backward out of the housing, teeth 64 interlock with teeth 58 and block movement of the strap to retain it in the housing, as shown in FIG. 4.

Figure 6:
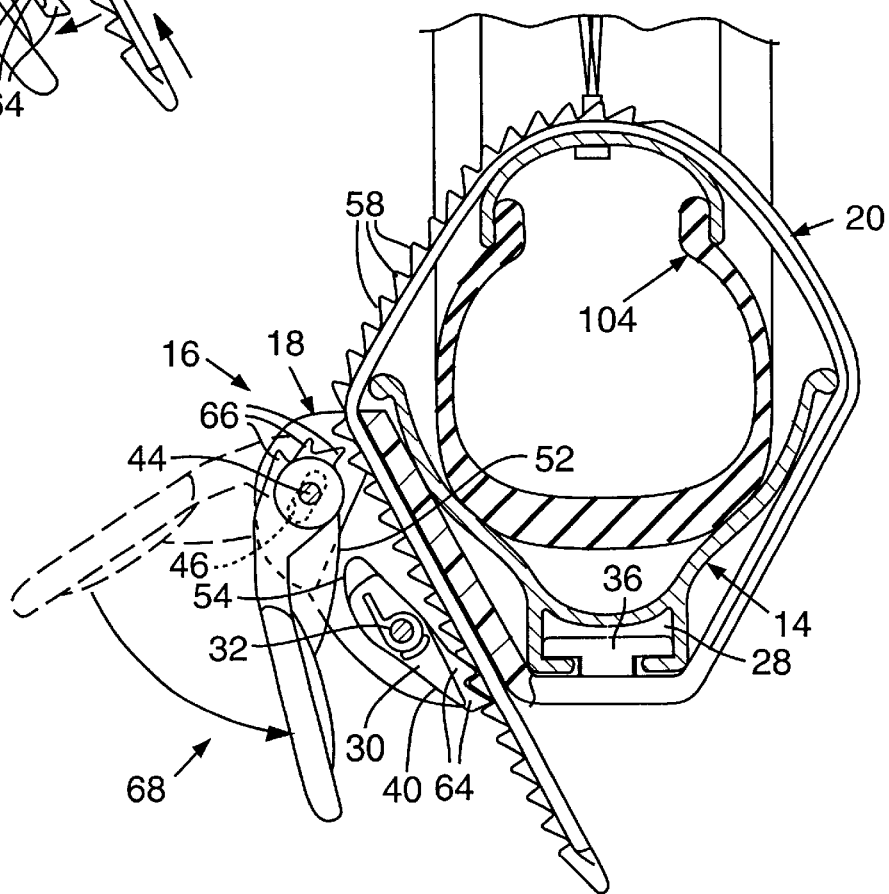
FIG. 6 is similar to FIG. 5 but shows the actuator arm pivoting downward to return to its nominal position.

Drive actuator 42 also includes one or more teeth 66 configured to engage teeth 58 on the strap. When the drive actuator is pivoted upward, teeth 66 interlock with, and engage teeth 58 to drive the strap through the housing, as shown in FIG. 5. As the drive actuator advances the strap through the housing, locking member 30 grips the strap and prevents it from pulling back out of the housing. As shown in FIG. 6, the drive actuator is then pivoted downward, under the bias of spring 50, into position to grip the next successive portion of the strap. Hole 46 in housing 18 is oblong, allowing pin 44 and drive actuator 42 to slide away from the strap. This enables teeth 66 to slide over teeth 58 on the downward stroke of drive actuator 42.

Figure 7:
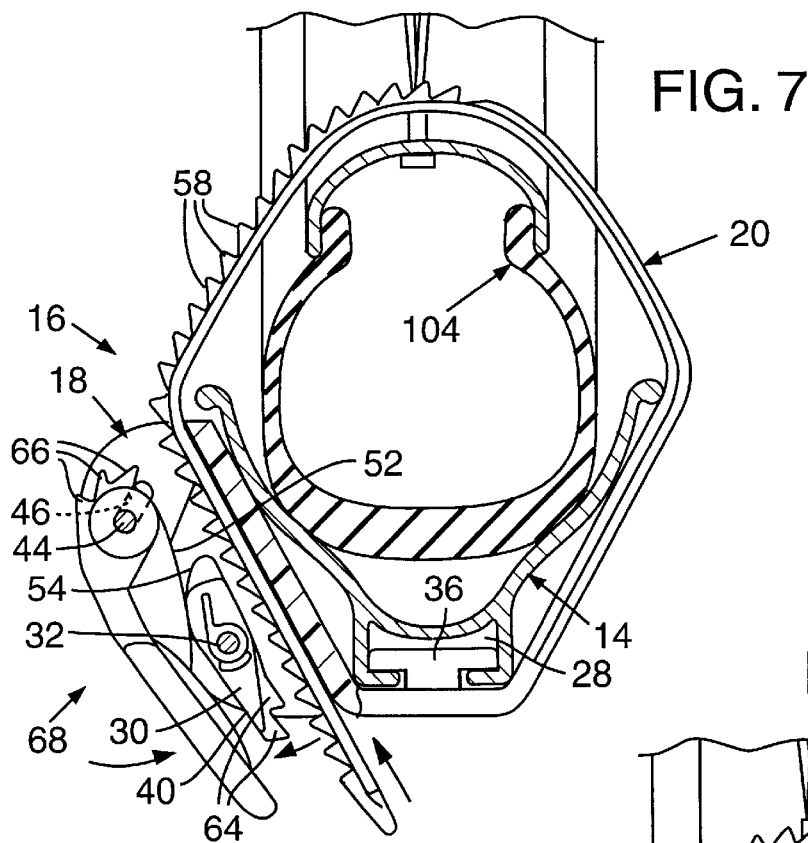
FIG. 7 is similar to FIG. 4 but shows the actuator arm pivoting downward past its nominal position to disengage the locking member from the strap.

In addition to driving strap 20 into housing 18, exemplary drive actuator 42 also is operable to disengage locking member 30 from the strap. As mentioned above, ribs 52 abut against the front end of the locking member when the drive actuator is released. Although the bias imparted to the drive actuator by spring 50 causes the ribs to apply a downward force on the front end of the locking member, the upward bias on the front end of the locking member due to spring 38 is sufficient to support the downward force applied by the ribs. However, a user may overcome the bias of spring 38 by pressing the drive actuator downward against the front end of the locking member. As shown in FIG. 7, this causes pin 44 and drive actuator 42 to slide backward in oblong hole 46 to a position more directly over the front end of the locking member. Continued downward movement by the drive actuator causes the back end of the locking member to pivot away from the strap, thereby disengaging teeth 64 from teeth 58 and allowing the strap to be removed from the housing.

Together, housing 18, locking member 30 and drive actuator 42 form a ratchet drive mechanism 68 adapted to receive the far end of strap 20 and tighten it around the recreational equipment. To operate the ratchet drive mechanism, the user positions the strap around the recreational equipment and inserts the far end of the strap into the housing until the strap is gripped by locking member 30. The user then repeatedly pivots drive actuator 42 up and down to grip successive portions of the strap and draw it tight. The drive actuator functions as a lever to magnify the force applied by the user. To release the strap, the user pivots the drive actuator downward into the locking member to disengage the locking member from the strap.

It will be appreciated that the drive mechanism may be operably formed in alternative configurations to those shown in the exemplary embodiments. As one example, drive actuator 42 may be in the form of a knob attached to a circular gear that engages the strap as the knob is rotated. Alternatively, mechanism 56 may omit drive actuator 42 and the strap may be advanced through the housing by other means (e.g., pushing or pulling the strap through the housing, etc.). As another alternative, mechanism 56 may omit the locking member and the housing may grip the strap by other means (e.g., frictionally, etc.).

The various components of securing apparatus 16 may be formed of any single material or combination of materials including metal, plastic, etc. In the embodiment where housing 18 and strap 20 are integrally formed of a single material, one suitable material is a rigid plastic such as injection-molded nylon. Locking member 30 and drive actuator 42 may also be formed of injection-molded nylon.

Typically, though not necessarily, springs 38 and 50, and pins 32 and 44 are formed of metal.

FIG. 8 illustrates another embodiment where at least a portion of securing apparatus 16 is integrally formed with support member 14 from a single material. Near end 22 of strap 20 is formed with one side of the support member, while housing 18 is formed with the opposite side of the support member. This embodiment ensures that the securing apparatus does not become dislodged or lost. Alternatively, either or both of strap 20 and housing 18 may be formed separately and then either permanently or removably attached to the support member by bolts, rivets, adhesive, snap-on connectors, etc.

FIG. 9 illustrates another embodiment where securing apparatus 16 includes plural ratchet drive mechanisms 68. The housings of the ratchet drive mechanisms are integrally formed with opposite sides of support member 14. Alternatively, one or both housings may be formed separately and attached to the support member by bolts, rivets, adhesive, etc. Strap 20 is formed separately with symmetrical ends 70. The ends include teeth 58 formed with opposing inclines adapted to be received by the opposing ratchet drive mechanisms. The embodiment shown in FIG. 9 allows the user to tighten the strap from either side of the support member. Thus, the support member and securing apparatus can be mounted on either side of a vehicle for similar ease of use.

Figure 10:
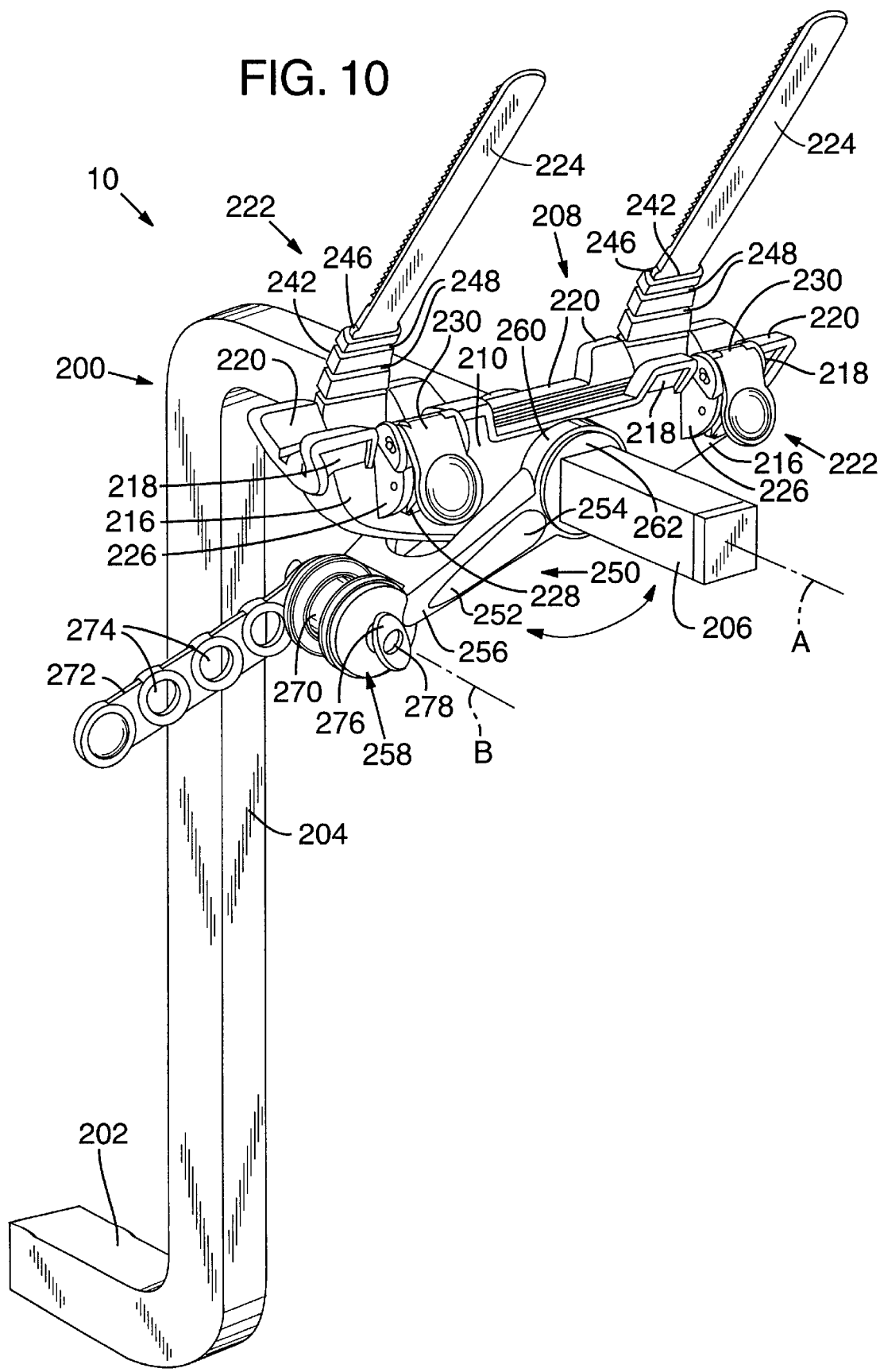
FIG. 10 is a perspective view of another exemplary embodiment of the invention.
Figure 11:
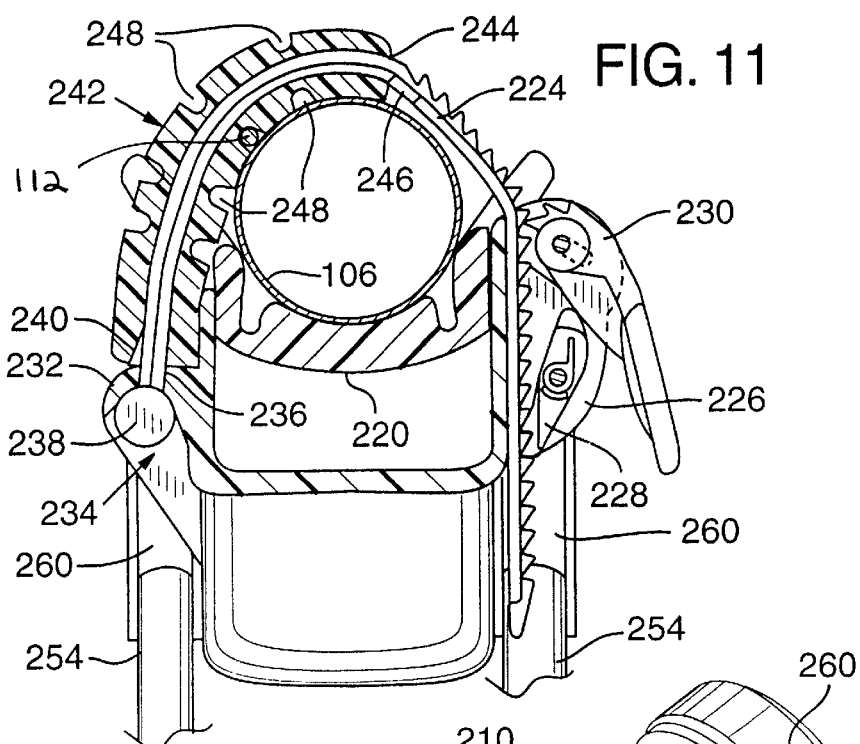
FIG. 11 is a magnified, cross-sectional view showing a bicycle top tube strapped into the cradle member of FIG. 10. The cross-section is taken along a plane between the outer edge of the strap and the strap cover.

FIGS. 10 and 11 illustrate another embodiment of the invention which is shown configured for use on vehicles with rear hitch-mounts, such as standard 2-inch by 2-inch or 1¼-inch by 1¼-inch receiver hitches. In this embodiment, rack assembly 10 includes a rack 200 mountable on a rear hitch-mount to carry one or more bicycles adjacent the rear of a vehicle. Rack 200 includes a hitch coupling member 202 adapted to securely attach to a rear hitch-mount. Coupling member 202 may be any of a variety of hitch couplings which are well known in the art. In addition, coupling member 202 may include one or more holes, slots, etc., (not shown) for receiving attachment devices such as bolts, pins, etc., which are associated with the vehicle receiver hitch. A single elongate, generally upright mast 204 extends upward from coupling member 202 adjacent the rear of the vehicle. In some embodiments, coupling member 202 and/or mast 204 may be pivotal to swing away from the rear of the vehicle to allow access to a rear door or trunk of the vehicle.

At least one support arm 206 extends outward or rearward from the upper end of mast 204. The support arm is typically rigidly connected to the mast to support the weight of one or more bicycles. In the exemplary embodiment depicted in FIG. 10, the support arm is integrally formed with the mast. Rack 200 is typically formed of a rigid material such as metal or plastic.

Rack assembly 10 also includes at least one load-carrying support member 208 associated with rack 200 to receive and retain the top tube 106 of a bicycle. In the exemplary embodiment, support member 208 is in the form of a cradle adapted to receive and at least partially surround the top tube. Cradle 208 includes a body 210 having a central bore 212 adapted to receive and grip support arm 206 to prevent the cradle from rotating about the support arm. Typically, the central bore is selectively contractible to clamp onto the support arm. In the exemplary embodiment illustrated in FIG. 11, a channel 214 passes from an outer portion of the cradle to the central bore. A screw (not shown) passes through body 210 and across the channel. When the screw is tightened, the width of the channel shrinks and the central bore contracts, thereby clamping onto the support arm. Cradle member 208 is adapted to slide axially along the support arm until clamped in place. A plurality of cradle members may be slid onto the support arm to carry a plurality of bicycles.

Typically, the support arm and cradle have matching non-circular lateral cross-sections. This allows the cradle member to slide along the support arm while preventing it from rotating about the support arm. In the exemplary embodiment, the lateral cross-section of the support arm is rectilinear. The lateral cross-section of central bore 214 is also rectilinear and sized to fit closely over the support arm. It will be appreciated that the lateral cross-sections of the support arm and central bore may be any desired non-circular shape, including oval, etc.

Figure 13:
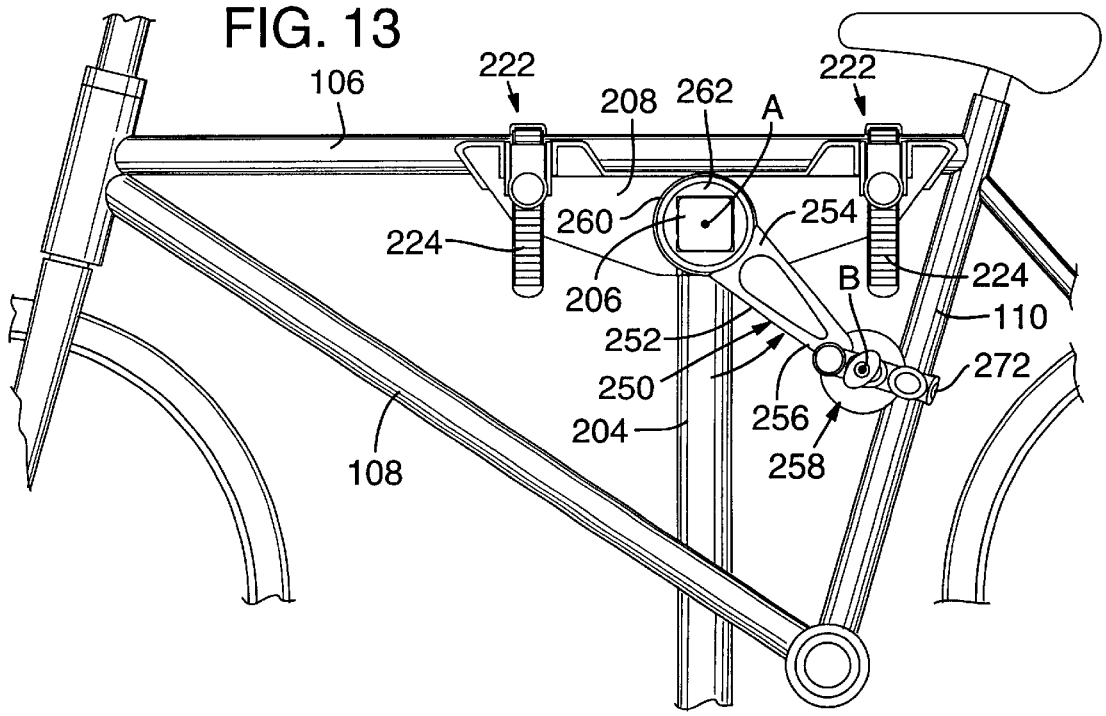
FIG. 13 is a rear elevation showing the top tube of a bicycle received in the cradle member, and the stabilizer member pivoted counter-clockwise to grip the seat tube.
Figure 14:
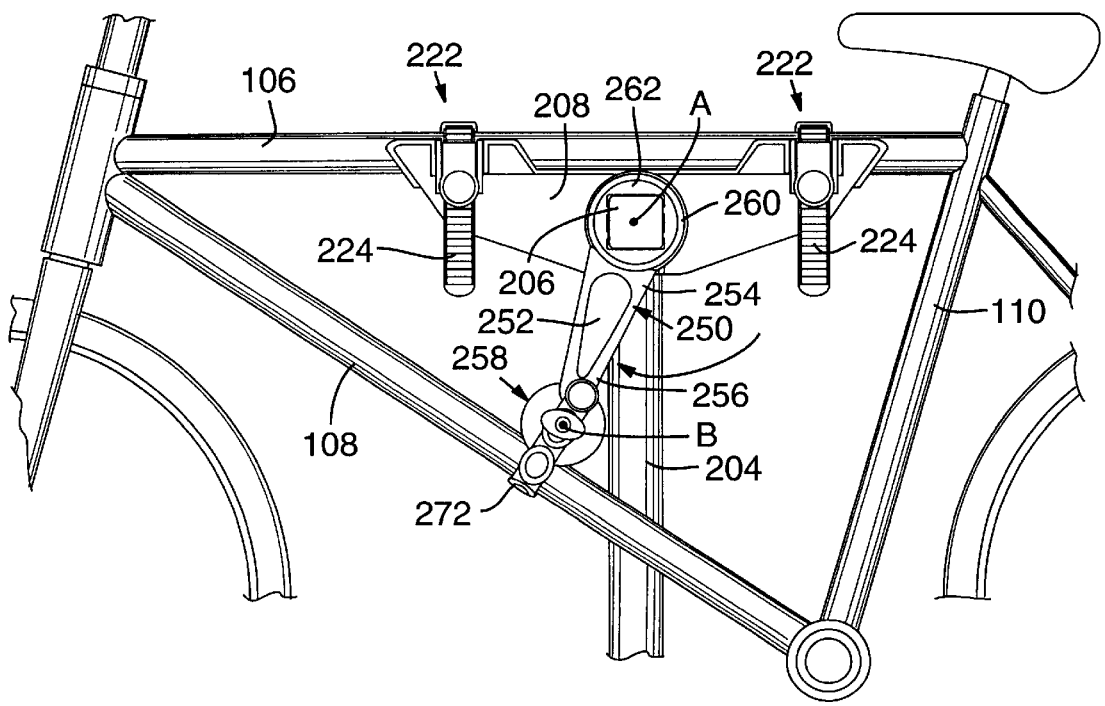
FIG. 14 is similar to FIG. 13 except that the bicycle is slid to the right in the cradle member, and the stabilizer member is pivoted clockwise to grip the down tube.

The body 210 of cradle member 208 includes a pair of opposing wing regions 216 extending laterally from central bore 212 to positions adjacent opposite sides of the support arm. The spaced-apart wing regions support and balance corresponding laterally-spaced portions of the bicycle top tube. The wing regions are spaced to fit between the upper portions of a bicycle down tube 108 and seat tube 110. Preferably, the bicycle is positioned so that the center-of-mass of the bicycle is between the opposing wing regions. (See FIGS. 13 and 14) This ensures the top tube will lie flat against the cradle member. Alternatively or additionally, the top tube may be secured to the cradle member to hold the top tube against both wing regions, as described in more detail below.

Each wing region includes one or more opposing shoulders 218 extending generally upward adjacent forward and rear edges of body 210. When the top tube of a bicycle is received on the cradle member between opposing shoulders, the shoulders prevent the top tube from becoming dislodged either forwardly or rearwardly from the cradle. Shoulders 218 may be angled outward to facilitate alignment of the top tube between the shoulders. Cradle member 208 is typically formed of a relatively rigid, light-weight material which is suitable for supporting the weight of a bicycle. In the exemplary embodiment, the cradle member is formed of 14% glass filled nylon. Alternatively, other materials may be used such as different plastics, aluminum, steel, etc.

A resilient covering 220 may be attached to the cradle member to cushion the top tube. Covering 220 may be formed of any suitable material such as an elastomer, etc. In the exemplary embodiment, covering 220 also extends over shoulders 218 to form a cushioned trough adapted to receive the top tube of a bicycle.

Figure 12:
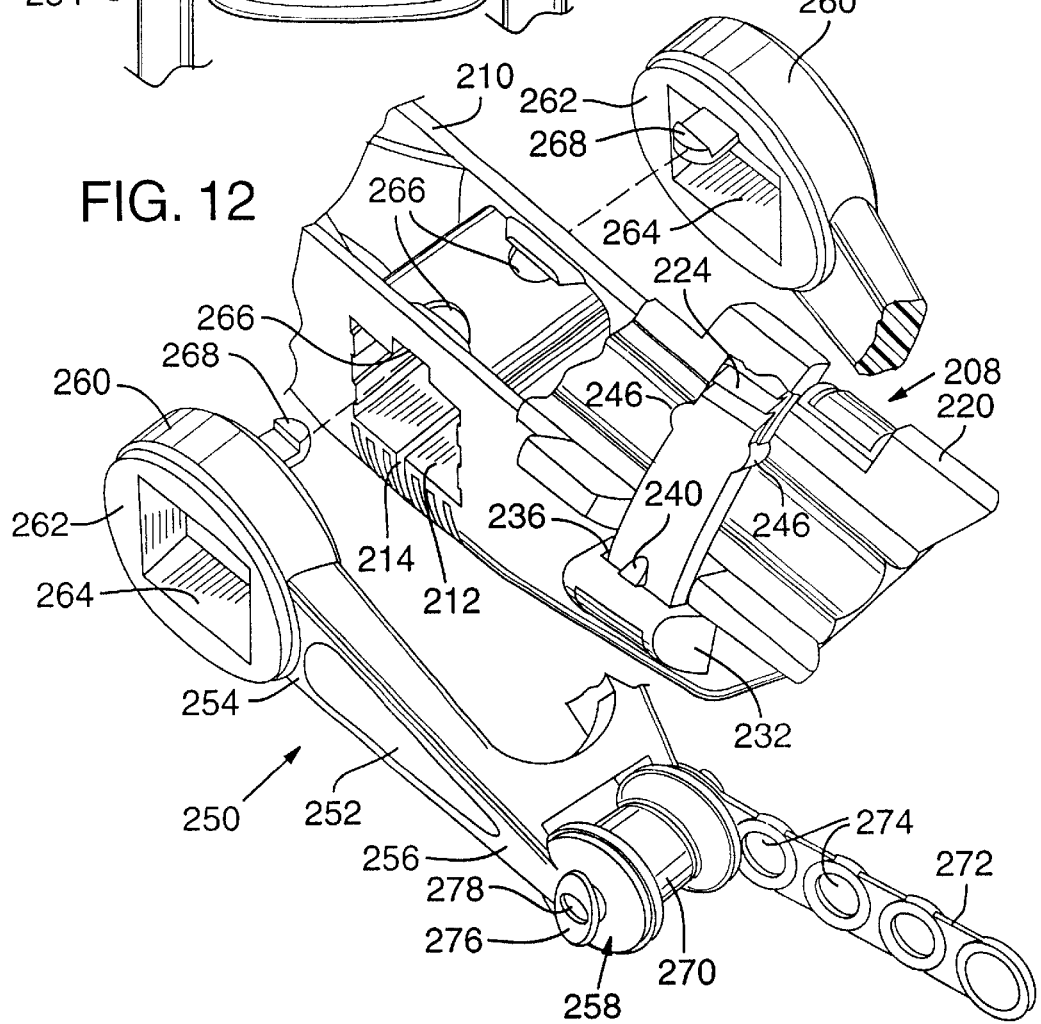
FIG. 12 is a fragmentary perspective and exploded view showing the connection of the stabilizer member to the cradle member of FIG. 10. The connection of the strap to the cradle member is also shown.

In one embodiment, rack assembly 10 also includes a securing system including at least one securing mechanism 222 adapted to retain the top tube in the cradle member. As shown in FIGS. 10–12, securing mechanism 222 includes a strap 224, which is positionable over the top tube and receivable in a housing 226. Ratchet 228 is coupled to the housing to engage the strap and prevent the strap from being removed from the housing. Drive actuator 230 is coupled to the housing and operable to grip the strap and advance it through the housing. The drive actuator may also be operable to disengage the ratchet to allow removal of the strap from the housing. In alternative embodiments, either ratchet 228 or drive actuator 230 may be omitted. As the securing mechanism has been described in detail above, that description will not be repeated here. It should be understood, however, that the securing mechanism may also take alternative forms including a flexible strap (such as described below), a clamp, a latch, a bracket, or any other device suitable for holding the top tube against the cradle member.

Rack assembly 10 may include a plurality of securing mechanisms associated with each cradle. For example, in the exemplary embodiment shown in FIGS. 10, 13, and 14, a securing mechanism is positioned adjacent each wing region 216. This arrangement ensures the top tube is held against both wing regions, thereby preventing the bike from rocking or lifting off one of the wing regions. Alternatively, the securing system may comprise a single securing mechanism located between the wing regions, which would also function to hold the top tube against both spaced-apart wing regions of the cradle member.

Housing 226 may be integrally formed with cradle member 208, as depicted in the exemplary embodiment. Alternatively, the housing may be formed separately and attached to the cradle by any suitable means. Similarly, strap 224 may be integrally formed with the cradle member or formed separately. As illustrated in FIGS. 11 and 12, strap 224 of the exemplary embodiment is formed separately from a substantially flexible material such as flexible polyester. The strap is coupled to the cradle member opposite housing 226. Cradle member 208 includes mount 232 which protrudes from body 210. Mount 232 defines a socket 234 and a slot 236. The slot is configured to receive strap 224. The rear end of the strap is attached to an anchor 238. The anchor is adapted to be received in socket 234 and is retained therein in response to tension on the strap because the anchor is dimensioned so that it cannot pass through slot 236. Thus, the strap is coupled to the cradle member by passing the strap through slot 236 until anchor 238 is received in socket 234. An inclined ridge or tab 240 on the strap prevents accidental removal of the strap from slot 236. Preferably, tab 240 can be passed backward through slot 236 with moderate force. While one example of a removable coupling between the strap and the cradle member has been shown and described, it will be appreciated that any type of coupling may be used within the scope of the invention. For example, the strap may be coupled to the cradle member by a bolt, etc. As another example, the strap may be coupled to housing 226, or the vehicle, or the bicycle, etc.

In the depicted embodiment of securing mechanism 222, a protective cover 242 is connected to the strap, to cushion the top tube from the strap; see FIGS. 10 and 11. Cover 242 is typically formed of a relatively resilient material such as an elastomer. The cover is connected to the strap so that the cover is interposed between the strap and the top tube when the strap is tightened. In the exemplary embodiment, cover 242 is in the form of a sleeve which defines an aperture 244 adapted to slidably receive the strap. As shown in FIG. 12, where cover 242 is not depicted in order to reveal underlying structure, one or more protruding regions 246 on the strap function to retain cover 242 on the strap. Typically, the strap is selectively expandable to slide over protruding regions 246.

Optionally, protective cover 242 may define one or more grooves 248 extending perpendicular to the elongate axis of the strap. As is well known to those of skill in the art, bicycles often have one or more control cables 112 (e.g., brake cable, gear cable, etc.) extending along the top tube. Grooves 248 are adapted to receive and fit around cables 112 when the strap is tightened over the top tube. As a result, cables 112 are not pinched between the strap and the tube. Since cable 112 may be placed at various positions about top tube 106, protective cover 242 typically is sized to allow it to slide between protruding regions 246 and mount 232 to align a groove with the cable.

In the depicted embodiment of the invention, rack assembly 10 includes a stabilizer member 250 adapted to grip a portion of the bicycle frame and impede swinging of the bicycle in cradle member 208. Stabilizer member 250 is associated with support arm 206, and movable to selectively grip either the down tube or the seat tube of a bicycle held in cradle member 208. Depending on the size and configuration of the bicycle frame, it may be necessary to slide the bicycle laterally in the cradle member to position stabilizer member 250 in contact with a selected portion of the bicycle frame. Together, cradle member 208 and stabilizer member 250 form an assembly adapted to hold the bicycle adjacent the rear of the vehicle.

In the exemplary embodiment depicted in FIGS. 10 and 12-14 stabilizer member 250 includes an elongate pivot arm 252 with a near end 254 adjacent support arm 206, and a far end 256 spaced apart from the support arm. A gripping member 258 is disposed adjacent far end 256 to contact and grip a portion of the bicycle frame. The stabilizer member also includes one or more collars 260 disposed adjacent near end 254. In the exemplary embodiment, pivot arm 252 is in the form of a fork assembly with two spaced-apart collars disposed adjacent near end 254.

Collars 260 have a circular inner surface and are adapted to fit over and rotate around support arm 206. In the embodiment of the invention where support arm 206 has a rectilinear (or otherwise non-circular) lateral cross-section, stabilizer member 250 also includes a bushing 262 associated with each collar. The bushing has a circular outer surface which is rotatably receivable in the collar. Bushing 262 also has a rectilinear (or otherwise non-circular) central bore 264 adapted to receive the support arm and prevent rotation of the bushing about the support arm. The combination of collars 260 and bushings 262 form a pivot assembly adapted to securely and pivotally couple stabilizer member 250 to the support arm even though the support arm has a non-circular cross-section. It should be noted that the bushing arrangement could also be used on non-circular cross bars on roof-mounted rack or other non-circular support members to pivotally couple another member of a rack to the support member.

The two halves of pivot arm 250 are sized to fit around the cradle member. As a result, the cradle member may be mounted on the support arm between spaced-apart collars 260. This serves to ensure the stabilizer member is aligned with a bicycle received in the cradle. A pair of slots 266 is formed in the upper portion of central bore 212. Each bushing 262 includes an inwardly projecting tongue 268 adapted to engage one of slots 266 and align the stabilizer member with the cradle member for mounting onto the support arm. Tongues 268 also grip the edges of slots 266 to prevent bushings 262 from sliding along the support arm away from the cradle member. In alternative arrangements, the stabilizer member may be mounted forward or rearward of the cradle member.

In the embodiment described above, stabilizer member 150 is mounted on the support member and pivots about a pivot axis A which coincides with the elongate central axis of the support member. It will be appreciated that other arrangements are also possible within the scope of the invention. For example, collars 260 may be rotatably coupled to the cradle member. As a further example, the collars may be rotatably coupled to some intermediate structure mounted on the support arm. In which case, pivot axis A would not be coincident with the central axis of the support member. In another example, stabilizer member 250 may be mounted on the support arm and cradle member 208 may be coupled to the stabilizer member. In any event, stabilizer member 250 is selectively movable in one direction to engage the down tube, and in an opposite direction to engage the seat tube. Thus, the stabilizer member can be moved to engage either the down tube or the seat tube regardless of which direction the bicycle is facing. Where plural bicycles are mounted on the support arm, the bicycles can be oriented facing in alternating directions so that less space is required between the bicycles.

Since the down tubes and seat tubes of different bicycles form different angles with respect to the top tube, gripping member 258 is typically shaped to present a uniform gripping surface when pivoted in either direction. As best seen in FIG. 10, gripping member 258 defines a central axis B which is parallel to pivot axis A and perpendicular to the pivot direction of the stabilizer member. Gripping surface 270 is substantially symmetric about central axis B. As a result, gripping member 258 presents a uniform gripping surface in all directions.

Gripping member 258 may have any uniform gripping surface 270 as desired for a particular application. In the exemplary embodiment, the gripping member has a gripping surface which is generally spool or hourglass shaped. In other words, gripping surface 270 is circumferentially concave, thereby presenting a concave gripping surface whether viewed along one pivot direction or along the opposite pivot direction. The concave gripping surface is adapted to receive and at least partially surround a portion of the bicycle frame such as down tube 108 or seat tube 110.

It will be appreciated that gripping member 258 may take any one of many symmetric forms configured to present a uniform gripping surface. Therefore, while one particular form has been illustrated and described, the invention is not limited to that particular form. Alternatively, the gripping member may be configured to present non-uniform gripping surfaces. For example, the gripping member may include one gripping surface adapted to grip a portion of the bicycle wheel, and a different gripping surface adapted to grip a portion of the bicycle frame.

Preferably, the bicycle frame is gripped by gripping member 258 at a point which is not co-linear with the top tube. For example, in FIGS. 13 and 14, the stabilizer member grips the frame at points below the top tube. This increases the amount of torque that stabilizer member 250 can apply to the frame to impede swinging of the bicycle. Alternatively, stabilizer member 250 may be configured to grip a portion of the bicycle above top tube 106.

Stabilizer member 250 may also include a strap 272 configured to retain the bicycle frame within the gripping member. In the exemplary embodiment, strap 272 is formed from an elastic material (e.g. Dynaflex G7431 rubber), and has a plurality of holes 274. Gripping member 258 includes anchor posts 276 adapted to fit within holes 274. Thus, the strap is employed to retain the bicycle frame in the gripping member by placing one of holes 274 over an anchor post, wrapping the strap around the bicycle frame, and placing another of the holes over the opposite anchor post.

The gripping member may be constructed of any suitable material, including an elastomer. The gripping member is connected to far end 256 of the pivot arm by a pin or bolt 278, which passes through both the gripping member and the pivot arm. In some embodiments, gripping surface 270 may be configured to rotate about central axis B to reduce rubbing between the gripping surface and the bicycle frame.

The embodiment of rack assembly 10 shown in FIGS. 10–14 includes cradle member 208, dual securing mechanisms 222, and stabilizer member 250. The securing mechanisms are disposed on opposite sides of the support arm. Thus, the bicycle is strapped at three locations, two spaced-apart locations along the top tube and a third location on either the down tube or the seat tube. This provides a very stable and secure arrangement for carrying the bicycle during travel because the bicycle is restrained from swinging, sliding, rotating or otherwise moving relative to the rack. Alternatively, the bicycle may be strapped at more locations or fewer locations. It will be understood that while the bike frame is described as being "strapped" to the rack, other means of securement may be used in place of one or more of the straps.

In another embodiment of rack assembly 10, the securing mechanism and cradle member may be omitted. Alternatively, the stabilizer member and/or the securing mechanism may be omitted. In any case, each embodiment of rack assembly 10 provides a flexible and secure apparatus for carrying a bicycle adjacent the rear of a vehicle.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to every one of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to some of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. Apparatus for carrying a bicycle on a vehicle having a rear hitch-mount, where the bicycle includes a frame having a top tube, a down tube and a seat tube, the apparatus comprising:

a bicycle rack mountable on the vehicle hitch-mount and adapted to support one or more bicycles adjacent the rear of the vehicle during travel, where the rack includes a generally upright mast and at least one support arm extending outwardly from the mast; and at least one assembly mounted on the at least one support arm to hold a bicycle, including load-carrying structure adapted to receive and retain a first one of the frame tubes of the bicycle on the support arm, the load-carrying structure including a cradle member, and a stabilizer member coupled to the load-carrying structure and pivotal about a pivot axis to selectively grip either of the frame tubes of the bicycle other than the first one, while the first one of the frame tubes is fixedly retained by the load-carrying structure, the stabilizer member including
an elongate pivot arm with a first end portion proximal to the pivot axis and a second end portion distal to the pivot axis, and
a gripping member disposed adjacent the second end portion of the pivot arm.

2. The apparatus of claim 1, where the load-carrying structure includes a cradle member adapted to receive the top tube of the bicycle.

3. The apparatus of claim 2 further comprising a securing mechanism adapted to retain the top tube in the cradle member, where the securing mechanism includes a strap positionable over the top tube, a housing attached to the cradle member and adapted to receive the strap, and a ratchet coupled to the housing and adapted to engage the strap and prevent removal of the strap from the housing.

4. The apparatus of claim 3, where the securing mechanism includes a drive actuator coupled to the housing and operable to grip the strap and advance it through the housing to tighten the strap over the top tube. cradle member.

5. The apparatus of claim 4, where the drive actuator is operable to disengage the ratchet from the strap to allow removal of the strap from the housing.

6. The apparatus of claim 3, where the housing is integrally formed with the cradle member.

7. The apparatus of claim 1, where the other frame tubes of the bicycle are the seat tube and the down tube and the stabilizer includes a gripping member that is shaped to present a uniform gripping surface whether pivoted in one direction to grip the down tube, or pivoted in an opposite direction to grip the seat tube.

8. The apparatus of claim 1, where the stabilizer includes a gripping member having a gripping surface that is concave as viewed along both pivot directions.

9. The apparatus of claim 1, where the stabilizer member is pivotally mounted on the at least one support arm.

10. The apparatus of claim 9, where the support arm has a non-circular lateral cross section, and where the stabilizer member includes a pivot assembly adapted to receive, and rotate about, the support arm.

11. The apparatus of claim 10, where the pivot assembly includes a bushing adapted to fit over the support arm, and a circular collar adapted to rotate about the bushing.

12. Apparatus for securing a bicycle on a vehicle-mounted rack, where the rack includes at least one support arm adapted to support the bicycle, the apparatus comprising:
a stabilizer member coupled to the support arm and selectively pivotal about a pivot axis, where the stabilizer member includes
an elongate pivot arm with a near end adjacent the support arm, and a far end spaced apart from the support arm, and
a gripping member disposed adjacent the far end of the pivot arm, where the gripping member defines symmetric gripping surfaces facing in opposite pivot directions.

13. The apparatus of claim 12, where the support arm defines a central elongate axis, and where the pivot axis coincides with the central elongate axis of the support arm.

14. The apparatus of claim 12, where the gripping member defines oppositely concave gripping surfaces.

15. The apparatus of claim 12, where the gripping member defines a circumferentially concave gripping surface.

16. The apparatus of claim 12, where the gripping member defines a generally hourglass-shaped gripping surface.

17. The apparatus of claim 12, where the near end of the pivot arm includes at least one collar adapted to fit over and rotate around the support arm.

18. The apparatus of claim 17, where the stabilizer member includes a bushing rotatably receivable in the collar and having a rectilinear central bore adapted to receive a support arm having a rectilinear lateral cross-section.

19. The apparatus of claim 18, where the at least one collar includes two spaced-apart collars adapted to fit over and rotate about the support arm, and further comprising a cradle member mountable on the support arm between the spaced-apart collars, where the cradle member includes a rectilinear central bore adapted to receive and grip the support arm to prevent rotation of the cradle member about the support arm.

20. Apparatus for carrying a bicycle on a vehicle having a rear hitch-mount, where the bicycle includes a frame having a top tube, a down tube and a seat tube, the apparatus comprising:
a bicycle rack mountable on the vehicle hitch-mount and adapted to support a bicycle adjacent the rear of the vehicle during travel; and
at least one assembly mounted on the rack to hold a bicycle, including
a load-carrying member having two spaced-apart regions adapted to support the top tube of the bicycle at two corresponding spaced-apart locations,
a securing system associated with the load-carrying member and adapted to hold the top tube against both spaced-apart regions of the load-carrying member, and
a stabilizer member coupled to the load-carrying member and pivotal about a pivot axis to selectively engage and grip either the down tube or the seat tube, while the top tube is fixedly retained by the load-carrying member, the stabilizer member including
an elongate pivot arm with a first end portion proximal to the pivot axis and a second end portion distal to the pivot axis, and
a gripping member disposed adjacent the second end portion of the pivot arm.

21. The apparatus of claim 20, where the rack includes a generally upright mast and at least one support arm extending outwardly from the mast, and where the two spaced-apart regions of the load-carrying member are positioned adjacent opposite sides of the at least one support arm.

22. The apparatus of claim 21, where the securing system includes two straps, and where each strap is coupled to the load-carrying member and positioned adjacent a different one of the two spaced-apart regions.

23. A rack for securing sports equipment to a vehicle, comprising:
at least one elongate support member having a non-circular cross section;
mounting structure adapted to secure the support member to the exterior of a vehicle;
a bushing portion configured to fit around the elongate support member; and
a first member pivotally mounted to the bushing for pivotal movement about the elongate axis of the support member.

24. The rack of claim 23, wherein the mounting structure is adapted to attach to a hitch receiver tube mounted to the vehicle.

25. The rack of claim 23, wherein the elongate, support member is generally rectilinear in cross section.

26. The rack of claim 23, wherein the bushing has a generally circular outer surface and the first member includes a collar adapted to fit over the bushing.

27. Apparatus for carrying a bicycle on a vehicle having a rear hitch-mount, where the bicycle includes a frame having a top tube, a down tube and a seat tube, the apparatus comprising:
- a bicycle rack mountable on the vehicle hitch-mount and adapted to support one or more bicycles adjacent the rear of the vehicle during travel, where the rack includes a generally upright mast and at least one support arm extending outwardly from the mast; and
- at least one assembly mounted on the at least one support arm to hold a bicycle, including
- load-carrying structure including a cradle member adapted to receive the top tube of the bicycle on the support arm,
- a securing mechanism adapted to retain the top tube in the cradle member, where the securing mechanism includes a strap positionable over the top tube, a housing attached to the cradle member and adapted to receive the strap, and a ratchet coupled to the housing and adapted to engage the strap and prevent removal of the strap from the housing, and
- a stabilizer member coupled to the load-carrying structure and pivotal about a pivot axis to selectively grip either the down tube or the seat tube to impede swinging of the bicycle, the stabilizer member including
- an elongate pivot arm with a first end portion proximal to the pivot axis and a second end portion distal to the pivot axis, and
- a gripping member disposed adjacent the second end portion of the pivot arm.

28. The apparatus of claim 27, where the securing mechanism includes a drive actuator coupled to the housing and operable to grip the strap and advance it through the housing to tighten the strap over the top tube.

29. The apparatus of claim 28, where the drive actuator is operable to disengage the ratchet from the strap to allow removal of the strap from the housing.

30. The apparatus of claim 27, where the housing is integrally formed with the cradle member.

31. Apparatus for carrying a bicycle on a vehicle having a rear hitch-mount, where the bicycle includes a frame having a top tube, a down tube and a seat tube, the apparatus comprising:
- a bicycle rack mountable on the vehicle hitch-mount and adapted to support one or more bicycles adjacent the rear of the vehicle during travel, where the rack includes a generally upright mast and at least one support arm extending outwardly from the mast, the at least one support arm having a non-circular lateral cross section; and
- at least one assembly mounted on the at least one support arm to hold a bicycle, including
- load-carrying structure including a cradle member adapted to receive and retain a first one of the tubes of the bicycle on the support arm, and
- a stabilizer member pivotally mounted on the at least one support arm, adapted to selectively grip either of the frame tubes of the bicycle other than the first one to impede swinging of the bicycle, and including a pivot assembly adapted to receive, and rotate about, the support arm, the stabilizer member including
- an elongate pivot arm with a near end adjacent the support arm, and a far end spaced apart from the support arm, and
- a gripping member disposed adjacent the far end of the pivot arm.

32. The apparatus of claim 31, where the pivot assembly includes a bushing adapted to fit over the support arm, and a circular collar adapted to rotate about the bushing.

33. Apparatus for carrying a bicycle on a vehicle having a rear hitch-mount, where the bicycle includes a frame having a top tube, a down tube and a seat tube, the apparatus comprising:
- a bicycle rack mountable on the vehicle hitch-mount and adapted to support a bicycle adjacent the rear of the vehicle during travel; and
- at least one assembly mounted on the rack to hold a bicycle, including
- a load-carrying member having two spaced-apart regions adapted to support the top tube of the bicycle at two corresponding spaced-apart locations,
- a securing system associated with the load-carrying member, adapted to hold the top tube against both spaced-apart regions of the load-carrying member, and including two straps, each strap being coupled to the load-carrying member and positioned adjacent a different one of the two spaced-apart regions, and
- a stabilizer member coupled to the load-carrying member and selectively pivotal about a pivot axis to engage and grip either the down tube or the seat tube, the stabilizer member including
- an elongate pivot arm with a first end portion adjacent the pivot axis and a second end portion spaced from the pivot axis, and
- a gripping member disposed adjacent the second end portion of the pivot arm.

34. Apparatus for carrying a bicycle on a vehicle having a rear hitch-mount, where the bicycle includes a frame having a top tube, a down tube and a seat tube, the apparatus comprising:
- a bicycle rack mountable on the vehicle hitch-mount and adapted to support one or more bicycles adjacent the rear of the vehicle during travel, where the rack includes a generally upright mast and at least one support arm extending outwardly from the mast; and at least one assembly mounted on the at least one support arm to hold a bicycle, including
- a load-carrying member having two spaced-apart regions adapted to support the top tube of the bicycle at two corresponding spaced-apart locations, and
- a stabilizer member coupled to the load-carrying member and selectively pivotal about a pivot axis positioned generally between the two spaced-apart regions of the load-carrying member, to grip either of the frame tubes of the bicycle other than the first one to impede swinging of the bicycle, the stabilizer member including
- an elongate pivot arm with a first end portion proximal to the pivot axis and a second end portion distal to the pivot axis, and
- a gripping member disposed adjacent the second end portion of the pivot arm.

35. The apparatus of claim 34, where the at least one support arm defines a central elongate axis, and the pivot axis coincides with the central elongate axis of the support arm.

36. The apparatus of claim 34, where the gripping member defines oppositely concave gripping surfaces.

37. The apparatus of claim 34, where the gripping member defines a circumferentially concave gripping surface.

38. The apparatus of claim 34, where the gripping member defines a generally hourglass-shaped gripping surface.

39. The apparatus of claim 34, where the near end of the pivot arm includes at least one collar adapted to fit over and rotate around the at least one support arm.

* * * * *